United States Patent [19]

Klett

[11] Patent Number: 5,243,487
[45] Date of Patent: Sep. 7, 1993

[54] GRAVURE PRESS WITH CROWBAR CIRCUIT

[75] Inventor: Keith K. Klett, Danville, Ill.

[73] Assignee: Hurletron Incorporated, Danville, Ill.

[21] Appl. No.: 630,865

[22] Filed: Dec. 20, 1990

[51] Int. Cl.⁵ .............................................. H02H 3/20
[52] U.S. Cl. ........................................ 361/56; 361/55
[58] Field of Search .................... 361/56, 54, 18, 74, 361/55, 57

[56] References Cited

U.S. PATENT DOCUMENTS

| | | | |
|---|---|---|---|
| 3,295,441 | 1/1967 | Garnier | 101/335 |
| 3,477,369 | 11/1969 | Adamson et al. | 101/335 |
| 3,579,036 | 5/1971 | McCoy | 317/16 |
| 3,619,720 | 11/1971 | Coberley | 317/3 |
| 3,725,739 | 4/1973 | Griffey | 317/16 |
| 3,766,433 | 10/1973 | Nowell | 361/56 |
| 4,208,965 | 6/1980 | Eichler et al. | 101/426 |
| 4,288,830 | 9/1981 | Brasfield | 361/56 |
| 4,360,850 | 11/1982 | Howard et al. | 361/56 |
| 4,656,365 | 4/1987 | Billings | 361/56 |
| 4,991,051 | 2/1991 | Hung | 361/57 |

OTHER PUBLICATIONS

Engineering Drawing No. 400015-002 of Glassman, Dec. 1985.

Primary Examiner—A. D. Pellinen
Assistant Examiner—Ronald W. Leja
Attorney, Agent, or Firm—Marshall, O'Toole, Gerstein, Murray & Borun

[57] ABSTRACT

A gravure printing press with an electrostatic assist unit having a fault detection circuit and crowbar circuit in which the crowbar circuit has a transformer with a primary winding and a plurality of secondary windings. Each of the secondary windings has a field-effect transistor which is turned on in response to the detection of a fault condition whereby the voltage applied to the press is substantially reduced to zero and any electrostatic charge is substantially removed. A capacitor is coupled in parallel with the gate and source terminals of each field-effect transistor to lengthen the on-time of the transistors.

13 Claims, 2 Drawing Sheets

GRAVURE PRESS WITH CROWBAR CIRCUIT

BACKGROUND OF THE INVENTION

The present invention relates to a gravure printing press having a crowbar circuit that reduces the voltage and electrostatic charge applied to the press upon the detection of a fault condition.

Gravure presses are conventional printing presses in which a relatively large voltage is applied to the press to enhance the quality of the printing. A gravure printing press is described in U.S. Pat. No. 3,477,369 to Adamson, et al. The use of a large voltage in a printing environment presents a danger due to the presence of very small ink particles in the printing environment. Under certain conditions, the voltage could ignite the ink particles, causing an explosion.

To reduce the likelihood of such an explosion, a gravure press is typically provided with a crowbar circuit that removes the large voltage and the electrostatic charge produced thereby from the gravure press upon the detection of a fault condition. The crowbar circuit is typically activated for a relatively short period of time to remove the voltage applied to the press and to eliminate the electrostatic charge on the press. However, since the crowbar circuit is only activated for a short period of time, substantially all of the electrostatic charge may not be removed. As a result, the danger of explosion may still exist even after the activation of the crowbar circuit.

SUMMARY OF THE INVENTION

The present invention is directed to a gravure printing press having an electrostatic assist unit in which a fault detector responds to the detection of a fault by activating a crowbar circuit to remove the voltage applied to the press and the resultant electrostatic charge. Such electrostatic charge is typically present on the impression roller of the press.

The crowbar circuit comprises a transformer with a primary winding and a plurality of secondary windings. Each of the secondary windings has a field-effect transistor associated therewith. When a fault is detected, the field-effect transistors are turned on, and an effective short circuit is provided between the press and ground to remove the electrostatic charge. A capacitor is coupled between each of the secondary windings and the field-effect transistors so as to increase the duration of the on-time of the transistors so that substantially all electrostatic charge is removed from the press. Providing a longer on-time for the transistors is advantageous because if a shorter on-time were provided, the likelihood that the electrostatic charge would be reduced to a safe level would not be as great.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
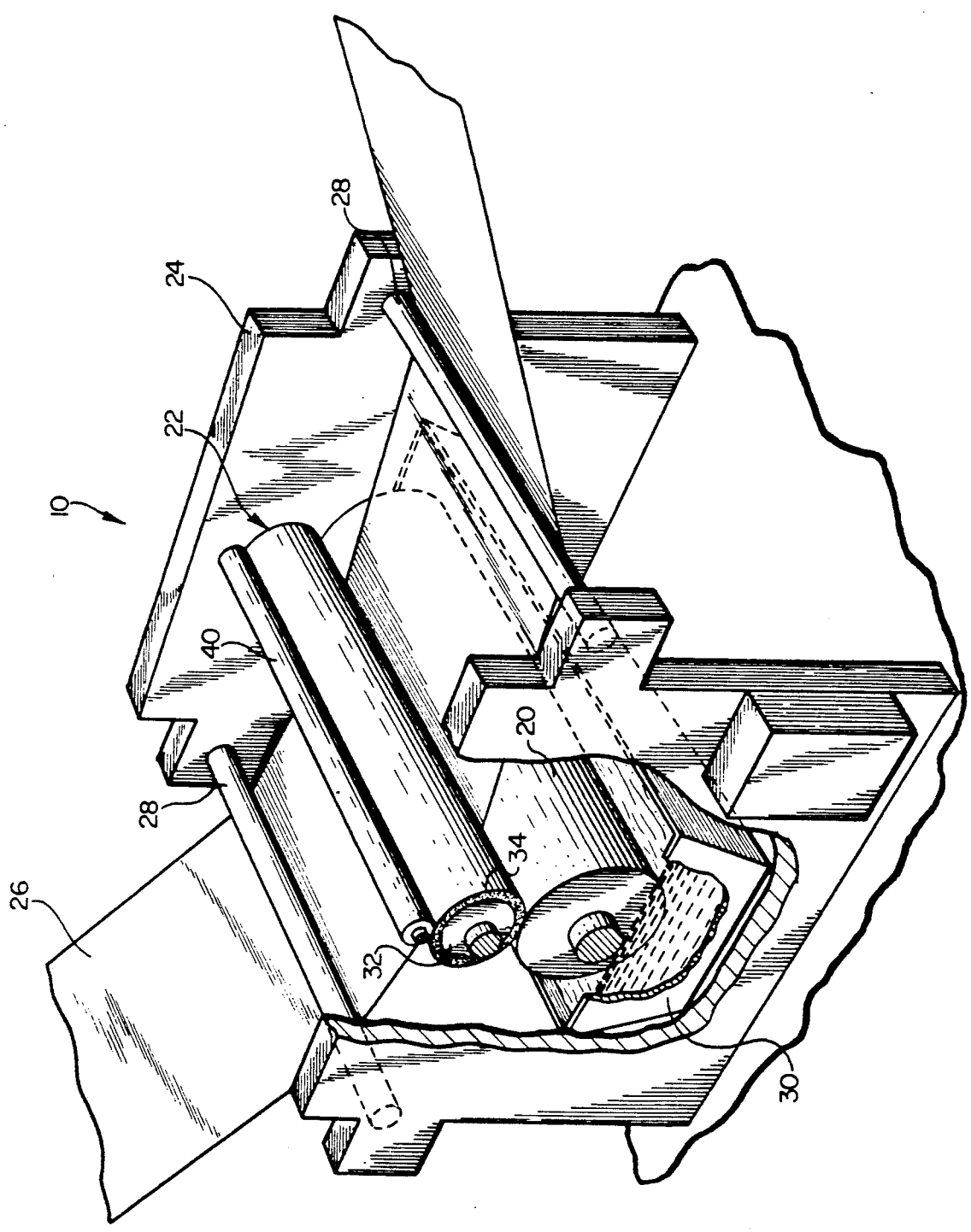
FIG. 1 is a perspective view of a gravure printing press with portions thereof removed for clarity.

A gravure printing press 10 is illustrated in FIG. 1. The gravure press has a gravure cylinder 20 supported in abutting engagement with an impression roller 22 by a frame 24. A web 26, such as paper, upon which the desired matter is printed passes between the gravure cylinder 20 and the impression roller 22. The web 26 is guided by a pair of rollers 28.

The gravure cylinder 20 has a large number of very small depressions or ink cells (not shown) which are provided with ink via an ink bath 30. Upon rotation, the ink cells in the gravure cylinder 20 transfer ink from the ink bath 30 to the web 26 to generate the desired pattern.

The impression roller 22 has a steel core 32 and a rubber cladding 34. As is conventional, an electrostatic charge is provided to the impression roller 22 by applying a relatively large voltage to the roller 22 to enhance the transfer of ink from the gravure cylinder 20 to the web 26. The means for applying voltage to the impression roller 22 is a conductive roller 40. Other means for applying voltage to the impression roller 22 could be used. For example, instead of the roller 40, a plurality of metal plates could be provided in contact with the impression roller 22 across its length. Still other ways of applying the electrostatic charge to the impression roller 22 could be used, and the particular manner of applying the charge is not considered part of the invention.

Figure 2:
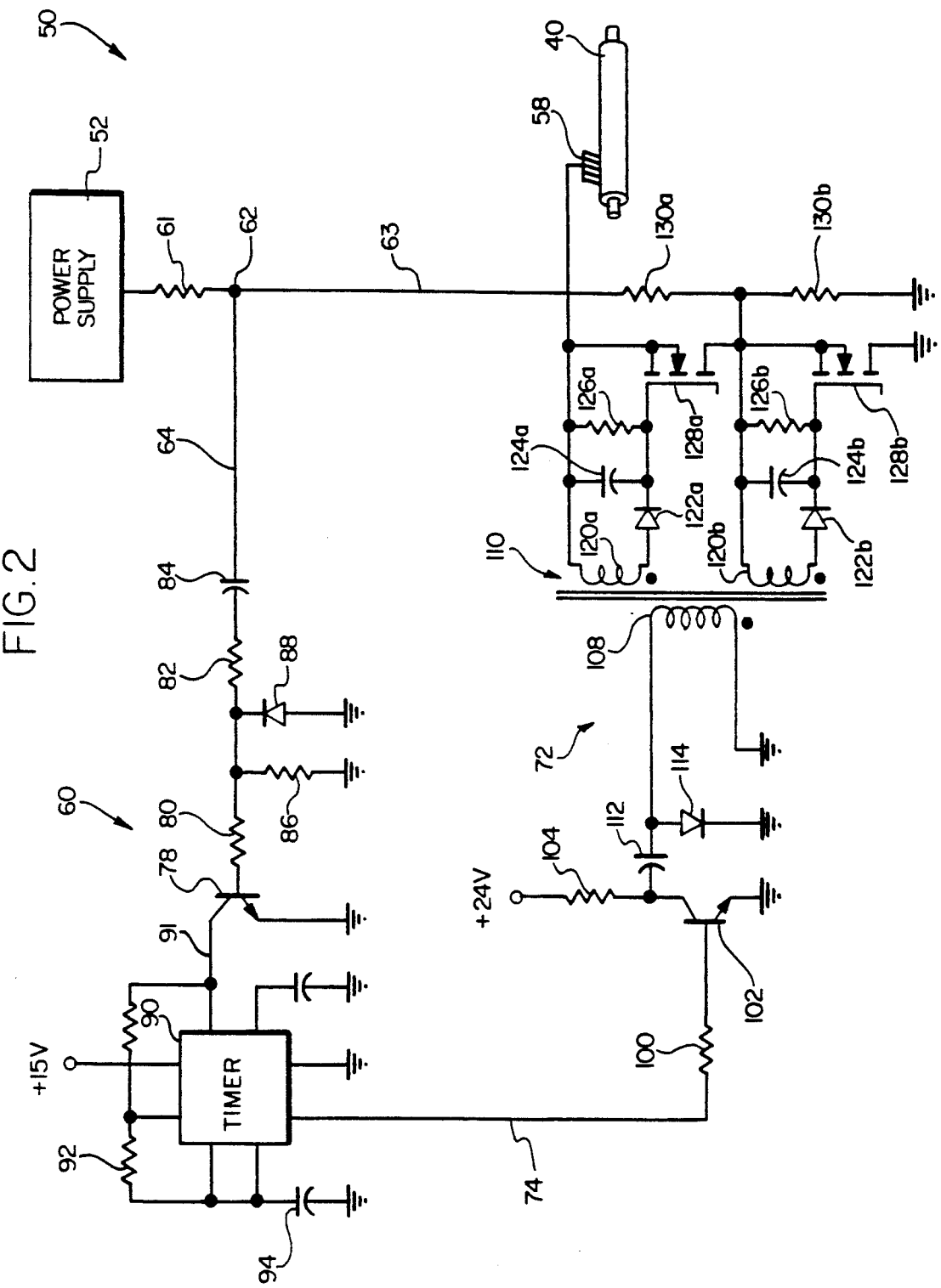
FIG. 2 is a circuit diagram of a portion of an electrostatic assist unit of the press of FIG. 1 with portions shown schematically.

The relatively large voltage applied to the roller 40 is generated by an electrostatic 10 assist (ESA) unit 50 shown in FIG. 2. As used herein, the term "large voltage" includes either a large positive or a large negative voltage since either of such voltages could be used to generate the desired electrostatic charge. A diagram of a portion of the ESA unit 50 is shown in FIG. 2. The ESA unit 50 has a power supply 52 that supplies a relatively large voltage which is applied to the roller 40 by means schematically shown as a brush 58.

The ESA unit 50 also includes a fault detector 60 coupled to sense the voltage at a point 62 on a conductor 63 that connects the supply 52 to the brush 58. A resistor 61 is coupled between the power supply 52 and the point 62. The fault detector 60 is coupled to the conductor 63 via a line 64. Upon the detection of a rate of change of voltage that is larger than a predetermined value, the fault detector 60 sends a signal, or pulse, to a crowbar circuit 72 via a line 74 to cause the crowbar circuit 72 to quickly remove the applied voltage and electrostatic charge from the impression roller 22. This is accomplished by effectively connecting the brush 58 to ground so as to substantially provide a short circuit from the roller 40 to ground. The use of the crowbar circuit 72 constructed in accordance with this invention is advantageous because the crowbar circuit 72 reacts very quickly to the detection of a fault condition by removing the electrostatic charge to prevent an explosion.

The fault detector 60 includes a transistor 78 coupled to the line 64 via a resistor 80, a resistor 82, and a capacitor 84. A resistor 86 and a diode 88 are connected between the resistors 80, 82. The sensitivity of the fault detector 60 to changes in voltage is determined by the values of the capacitor 84 and the resistors 80, 82, 86 and the gain of the transistor 78.

The transistor 78 is connected to a timer 90 via a line 91. The timer 90 may be, for example, an LM555 integrated circuit chip. The timer 90 has biasing circuitry, including a resistor 92 and a capacitor 94. The transistor 78 is normally biased off, but upon a sufficient rate of change of the voltage at the point 62, the transistor 78 is turned on, thus causing the voltage on the line 91 to go low, or become approximately zero. The change in voltage occurs, in the case of a negative supply 52, as a result of an arc between the rollers 20, 32. This arc causes the voltage at the point 62 to become less negative.

As a result of the voltage on the line 91 going low, the output of the timer 90 on the line 74 (which is normally low) goes high for a predetermined period of time, which is determined by the values of the resistor 92 and the capacitor 94. After the predetermined period of time elapses, the timer output on the line 74 goes low. Thus, the timer 90 acts like a monostable multivibrator, or one-shot.

While the fault detector 60 shown is for a power supply that generates a large negative voltage, the particular design of the fault detector 60 is not considered part of the invention, and any type of fault detector could be used. Such a fault detector could be responsive to fault conditions other than a positive-going voltage. For example, where the supply 52 generates a large positive voltage, the fault detector 60 could respond to a negative-going voltage. Still other types of faults could be detected.

The pulse generated by the fault detector 60 via the line 74 is provided to the crowbar circuit 72. The crowbar circuit 72 includes a resistor 100 coupled to the line 74 and the base of a transistor 102. The collector of the transistor 102 is connected to a supply voltage via a resistor 104. The collector of the transistor 102 is also connected to the primary winding 108 of a transformer 110 through a capacitor 112. A diode 114 is connected between ground and the junction of the capacitor 112 and the primary winding 108.

When no fault condition is detected by the fault detector 60, the transistor 102 is off, and the capacitor 112 is charged up through the resistor 104 and the diode 114 to a voltage close to that of the supply voltage. As described above, when a fault condition is detected, the detector 60 transmits a pulse to the base of the transistor 102 via the line 74. As a result, the transistor 102 turns on and discharges the capacitor 112 through the winding 108, thus inducing a pulse in the primary winding 108. The pulse induced in the primary winding 108 generates a pulse in each of a plurality of secondary windings 120a, 120b of the transformer 110.

Each of the secondary windings 120a, 120b has a diode 122, a capacitor 124, a resistor 126, a field-effect transistor (FET) 128, and a resistor 130 associated therewith. The combination of the circuit elements 120, 122, 124, 126, 128 and 130 is referred to herein as a crowbar "subcircuit." While only two such subcircuits are shown in FIG. 2, more subcircuits could be used as explained below.

When the primary winding 108 induces a pulse in the secondary winding 120a, the capacitor 124a is charged up by the pulse through the diode 122a. As a result, the gate of the FET 128a becomes more positive than its source, and the FET 128a is turned on, causing its source-to-drain impedance to become very low. As a result, there is essentially a short circuit between the source and drain terminals of the FET 128a.

At approximately the same time, the FET 128b also turns on as a result of the pulse in the secondary winding 120b in the same manner as described above. Since the FETs 128a, 128b are connected in series between the brush 58 and ground, any electrostatic charge on the roller 40, and thus on the impression roller 22, is quickly shunted to ground.

The FETs 128a, 128b remain on as long as the capacitors 124a, 124b remain charged. This on-period, which may be approximately 0.2 seconds for example, is determined primarily by the values of the capacitors 124 and the resistors 126. After the capacitors 124a, 124b are initially charged up by the pulses through the secondary windings 120a, 120b, each capacitor 124 slowly discharges through its respective resistor 126.

An advantage of the use of field-effect transistors, instead of bipolar transistors, for example, is that field-effect transistors have very high gate-to-source impedances. As a result, the charge on each of the capacitors 124 remains for a relatively long period of time, and is not quickly dissipated through the FETs 128. Thus, each capacitor 124 in combination with each FET 128 is a means for turning on the FETs 128 for a period of time longer than the associated charging pulse from the windings 120, which may have a duration of about several microseconds. This is an advantage because the increased on-time of FETs 128 ensures that more of the electrostatic charge on the impression roller 22 is removed, thus decreasing the risk of an explosion.

While only two crowbar subcircuits are shown, more may be used. Each subcircuit that is used is connected so that the FETs 128 are provided in series so that, when turned on, they essentially provide a short-circuit path from the impression roller 22 to ground so as to remove the electrostatic charge from the roller 22. The term "short circuit" as used herein does not require a zero-resistance path since there is typically some resistance through the drain and source terminals of the FETs 128 even when the FETs 128 are turned fully on.

The number of subcircuits that are used depends upon the magnitude of the voltage supplied by the power supply 52 and the breakdown voltages of the FETs 128. For example, if the power supply 52 generates 3600 volts and the breakdown voltage of each of the FETs 128 is 600 volts, then at least six subcircuits would be required.

The resistors 130 connected in parallel to the FETs 128 are used to ensure that the voltage across each of the FETs 128 is substantially equal. To this end, each of the resistors 130 is selected to have the same relatively large resistance value. If the resistors 130 were not used, there is no guarantee that the voltage across each FET 128 would be the same, and as a result, one of the FETs 128 might break down even though the average voltage across the FETs 128 was less than the FET breakdown voltage.

The electrostatic assist unit 50 shown and described herein may have additional circuits. These additional circuits may include, for example, one or more relays connected between the power supply 52 and the roller 40 for disconnecting the power supply 52 from the roller 40 after the detection of a predetermined number of fault conditions and means for regulating the voltage provided by the supply 52. Other circuits, such as web break detectors, excess current sensors, or test circuits, may also be used.

Many modifications and alternative embodiments of the invention will be apparent to those of ordinary skill in the art in view of the foregoing description of the preferred embodiment. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gravure printing press, comprising:
    a gravure cylinder;
    an impression roller;
    means for applying a voltage to said impression roller so as to provide an electrostatic charge on said impression roller;
    a frame for supporting said gravure cylinder and said impression roller;
    an electrostatic assist unit comprising:
        a power supply for generating a supply voltage;
        a transformer having a primary winding and a plurality of secondary windings coupled to said primary winding;
        a plurality of field-effect transistors, each of said field-effect transistors being coupled to a respective one of said secondary windings of said transformer;
        a plurality of capacitors, each of said capacitors being coupled to a respective one of said secondary windings; and
        a fault detector coupled to said transformer for sensing a fault condition, said fault detector causing a pulse to be provided to said primary winding to induce a charging pulse in each of said secondary windings of said transformer, each of said charging pulses causing a respective one of said capacitors to be charged, thus causing each of said field-effect transistors to be turned on to remove the electrostatic charge from said impression roller.

2. A gravure printing press as defined in claim 1 wherein said means for applying a voltage comprises a conductive roller.

3. A gravure printing press as defined in claim 2 wherein said means for applying a voltage additionally comprises a brush provided in contact with said conductive roller.

4. A gravure printing press as defined in claim 1 wherein said fault detector comprises a voltage sensor.

5. An electrostatic assist unit for a gravure printing press, said electrostatic assist unit having a crowbar circuit coupled to a power supply for generating a relatively large voltage, said electrostatic assist unit comprising:
    a transformer having a primary winding and a plurality of secondary windings coupled to said primary winding;
    a plurality of field-effect transistors, each of said field-effect transistors being coupled to a respective one of said secondary windings of said transformer;
    a plurality of capacitors, each of said capacitors being coupled to a respective one of said secondary windings; and
    a fault detector coupled to said transformer for detecting a fault condition, said fault detector causing a pulse to be provided to said primary winding to induce a charging pulse in each of said secondary windings of said transformer, each of said charging pulses causing a respective one of said capacitors to be charged, thus causing each of said field-effect transistors to be turned on.

6. An electrostatic assist unit as defined in claim 5 wherein said fault detector comprises a voltage sensor.

7. An electrostatic assist unit as defined in claim 5 additionally comprising a plurality of resistors, each of said resistors being coupled in parallel with a respective one of said field-effect transistors.

8. An electrostatic assist unit for a gravure printing press, said electrostatic assist unit having a crowbar circuit coupled to a power supply for generating a relatively large voltage and an electrostatic charge on said press, said electrostatic assist unit comprising:
    a transformer having a primary winding and a secondary winding coupled to said primary winding;
    a switching device coupled to said secondary winding of said transformer, said switching device being coupled in series across said terminals of said power supply;
    a circuit coupled to said transformer for generating a signal upon the detection of a fault condition, said signal being provided to said primary winding to induce a pulse in said secondary winding of said transformer, said pule being provided to said switching device to turn said switching device on to remove the electrostatic charge from said press; and
    circuit means for causing said switching device to be turned on for a greater period of time than the duration of said pulse, wherein said circuit means comprises a capacitor coupled to said secondary winding.

9. An electrostatic assist unit for a gravure printing press, said electrostatic assist unit having a crowbar circuit coupled to a power supply for generating a relatively large voltage and an electrostatic charge on said press, said electrostatic assist unit comprising:
    a transformer having a primary winding and a secondary winding coupled to said primary winding;
    a switching device coupled to said secondary winding of said transformer, said switching device being coupled in series across said terminals of said power supply and comprising a field-effect transistor;
    a circuit coupled to said transformer for generating a signal upon the detection of a fault condition, said signal being provided to said primary winding to induce a pulse in said secondary winding of said transformer, said pulse being provided to said switching device to turn said switching device on to remove the electrostatic charge from said press; and
    circuit means for causing said switching device to be turned on for a greater period of time than the duration of said pulse, wherein said circuit means comprises a capacitor coupled between said secondary winding and said field-effect transistor.

10. An apparatus, comprising:
    a transformer having a primary winding and a secondary winding coupled to said primary winding;
    a switching device coupled to said secondary winding of said transformer;
    a circuit coupled to said transformer for generating a signal upon the detection of a fault condition, said signal being provided to said primary winding to induce a pulse in said secondary winding of said transformer, said pulse being provided to said switching device to turn said switching device on to provide a short circuit through said switching device; and circuit means for causing said switching device to be turned on for a greater period of time than the duration of said pulse, wherein said circuit means comprises a capacitor coupled between said secondary winding.

11. An apparatus, comprising:

a transformer having a primary winding and a secondary winding coupled to said primary winding;

a switching device coupled to said secondary winding of said transformer, said switching device comprising a field-effect transistor;

a circuit coupled to said transformer for generating a signal upon the detection of a fault condition, said signal being provided to said primary winding to induce a pulse in said secondary winding of said transformer, said pulse being provided to said switching device to turn said switching device on to remove provide a short circuit through said switching device; and circuit means for causing said switching device to be turned on for a greater period of time than the duration of said pulse, wherein said circuit means comprises a capacitor coupled between said secondary winding and said field-effect transistor.

12. An electrostatic assist unit for a gravure printing press, said electrostatic assist unit having a crowbar circuit coupled to a power supply for generating a relatively large voltage and an electrostatic charge on said press, said electrostatic assist unit comprising:

a transformer having a primary winding and a plurality of secondary windings coupled to said primary winding;

a plurality of switching devices, each of said switching devices coupled to a respective one of said secondary windings of said transformer;

a circuit coupled to said transformer for generating a signal upon the detection of a fault condition, said signal being provided to said primary winding to induce a pulse in each of said secondary windings of said transformer, said pulses being provided to said switching devices to turn said switching devices on to remove the electrostatic charge from said press; and circuit means for causing said switching device to be turned on for a greater period of time than the duration of said pulse, wherein said circuit means comprises a capacitor coupled to a respective one of said secondary windings.

13. An electrostatic assist unit for a gravure printing press, said electrostatic assist unit having a crowbar circuit coupled to a power supply for generating a relatively large voltage and an electrostatic charge on said press, said electrostatic assist unit comprising:

a transformer having a primary winding and a secondary windings coupled to said primary winding;

a plurality of switching devices, each of said switching devices coupled to a respective one of said secondary windings of said transformer, said switching devices comprising field-effect transistors;

a circuit coupled to said transformer for generating a signal upon the detection of a fault condition, said signal being provided to said primary winding to induce a pulse in each of said secondary windings of said transformer, said pulses being provided to said switching devices to turn said switching devices on to remove the electrostatic charge from said press; and circuit means for causing said switching device to be turned on for a greater period of time than the duration of said pulse, wherein said circuit means comprises a capacitor coupled between one of said secondary windings and one of said field-effect transistors.

* * * * *

UNITED STATES PATENT AND TRADEMARK OFFICE
CERTIFICATE OF CORRECTION

PATENT NO. : 5,243,487
DATED : September 7, 1993
INVENTOR(S) : Keith K. Klett

It is certified that error appears in the above-identified patent and that said Letters Patent is hereby corrected as shown below:

Col. 2, line 33, delete "10" after "electrostatic".

Col. 7, line 22, delete "remove" after "to".

Col. 8, line 19, before "secondary", insert --plurality of--.

Col. 8, line 34, "device" should be --devices--.

Signed and Sealed this

Tenth Day of May, 1994

Attest:

BRUCE LEHMAN

Attesting Officer      Commissioner of Patents and Trademarks